G. I. ROCKWOOD.
PIPE HANGER.
APPLICATION FILED NOV. 3, 1910.
1,052,278.
Patented Feb. 4, 1913.
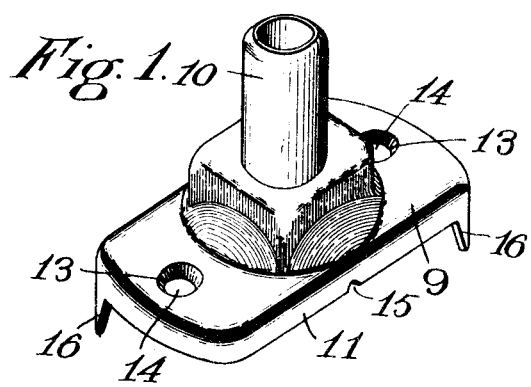
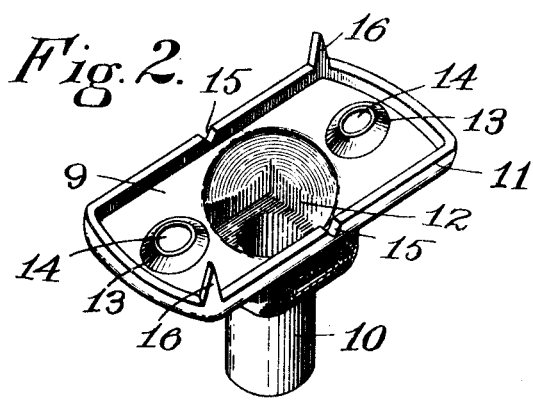
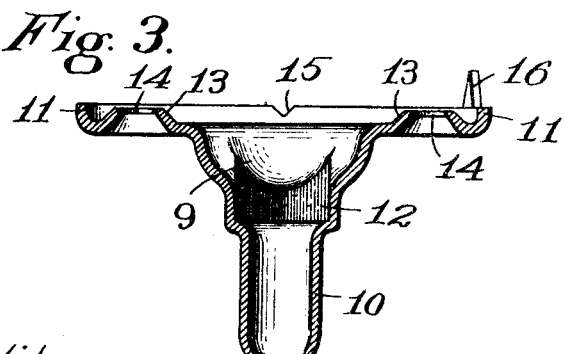
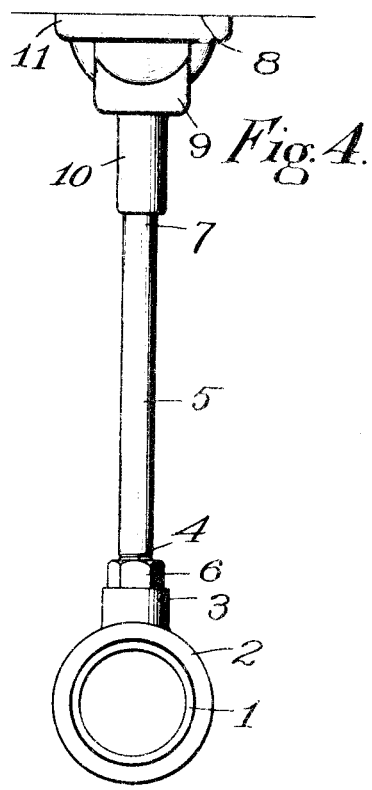
Witnesses.
R. D. Tolman
Penelope Cumberbach
Inventor
George I. Rockwood.
By Rufus B. Fowler
Attorney

UNITED STATES PATENT OFFICE.

GEORGE I. ROCKWOOD, OF WORCESTER, MASSACHUSETTS.

PIPE-HANGER.

1,052,278. Specification of Letters Patent. Patented Feb. 4, 1913.

Application filed November 3, 1910. Serial No. 590,456.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Pipe-Hangers, of which the following is a specification, accompanied by drawings forming a part of the same.

My invention relates to improvements in a support for a pipe hanger which is designed to afford means for supporting the pipe hanger from a horizontal surface, and it consists in an improved method of construction of said support by which it is held more securely in position, as hereinafter described and pointed out in the annexed claim.

Figure 1 is a perspective view of the support for my pipe hanger. Fig. 2 is a perspective view of the support from the side opposite to that shown in Fig. 1. Fig. 3 is a side view of the support shown in central vertical section. Fig. 4 shows a pipe hanger in position supporting a pipe with the support shown in end view.

Similar reference characters refer to similar parts in the different figures.

Referring to the accompanying drawings; as shown in Fig. 4 the pipe 1 is supported by the ring 2 which is provided with a hub 3 into which the screw threaded end 4 of a rod 5 is inserted and held therein by a check nut 6. The upper end 7 of the rod 5 is suspended from a horizontal surface 8 by a support 9, the construction of which is shown in Figs. 1, 2 and 3. The support 9 is provided with a hub 10 which is arranged to extend downwardly when a rim 11 is in position to contact with the horizontal surface 8. The upper end 7 of the rod is provided with screw threads and is inserted through the hub 10. A nut is then attached to the screw threaded end of the rod and is arranged to fit a rectangular space 12 in the interior of the support 9, thereby preventing the rotation of the rod separately from the support 9. The support 9 is constructed of sheet metal, or other elastic material, with the opening 12 and hub 10 in approximately the center and surrounded by the rim 11 which is designed to be in contact with the horizontal surface 8. The body of the support 9 is arranged to extend on two sides of the opening 12, which are each provided with an upwardly projecting boss 13 surrounding a screw hole 14. As shown in Fig. 3 the bosses 13 do not normally extend as far upwardly as the rim 11, and the elasticity of the support is relied on to exert a downward pressure upon the screws inserted in the openings 14 when the bosses 13 are drawn, by rotation of the screws, into contact with the horizontal surface 8. This downward pressure upon the screws prevents their accidental displacement and holds them securely in position to support the hanger.

To aid in fixing the support 9 in position upon the horizontal surface 8, notches 15 are provided in the rim 11 on opposite sides of the support 9, by means of which the support 9 may be adjusted relatively to a mark upon the surface 8. As the hangers are ordinarily used in series this enables an entire series to be placed to correspond with a single line. The rim 11 of the support 9 is also provided upon opposite sides of a line connecting the notches 15 with upwardly projecting spurs 16, which are caused to enter the surface 8 by pressure upon the support 9 after the notches 15 are correctly placed, thereby preventing further rotation or movement of the support 9 upon the surface 8 and securely holding it in position until the screws are inserted.

By the insertion of the screws in the surface 8 the projecting extremities of the bosses 13 are drawn into contact with the surface 8, and the elasticity of the material forming the support 9 exerts a downward pressure upon the screws in the surface 8, thereby securing them in position as has already been pointed out.

I claim,

A pipe hanger, comprising a support adapted to be attached to and depend from a horizontal surface, said support being struck from a single piece of elastic sheet metal and consisting of an elongated plate entirely surrounded by a raised rim and provided at its center with a hub inclosing a rectangular space and depending from said hub a cylindrical tubular section, said plate having a screw hole between said hub and the ends of said plate and midway between the rim on opposite sides of the plate, whereby the strain exerted by the attaching screw upon the yielding horizontal plate will be equally resisted by the rim on opposite sides of the plate.

GEORGE I. ROCKWOOD.

Witnesses:
PENELOPE COMBERBACH,
NELLIE WHALEN.